Dec. 27, 1927.

A. G. HATCH

KEYLESS LOCK

Re. 16,833

2 Sheets-Sheet 1

Original Filed June 12, 1925

INVENTOR
A. G. Hatch
BY
Wilkinson & Hinsta
ATTORNEYS.

Dec. 27, 1927. A. G. HATCH Re. 16,833
KEYLESS LOCK
Original Filed June 12, 1925 2 Sheets-Sheet 2
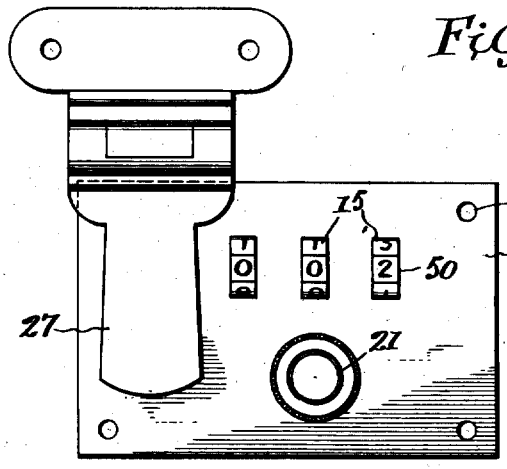
Fig. 4.
Fig. 5.
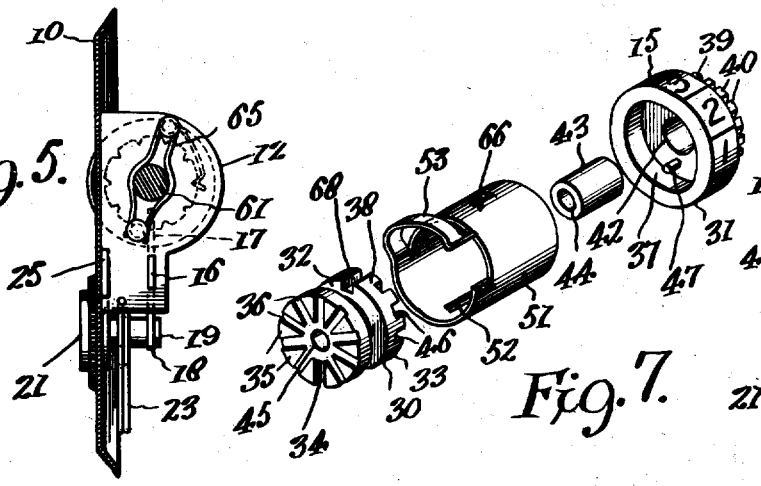
Fig. 7.
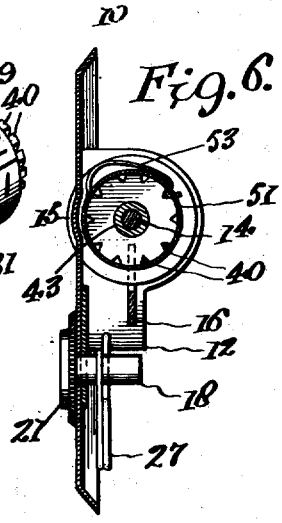
Fig. 6.
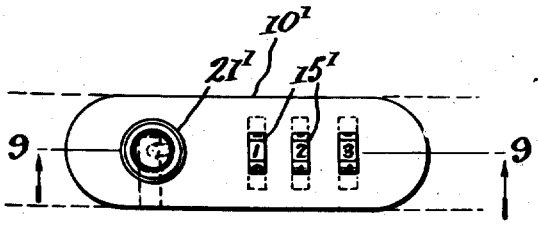
Fig. 8.
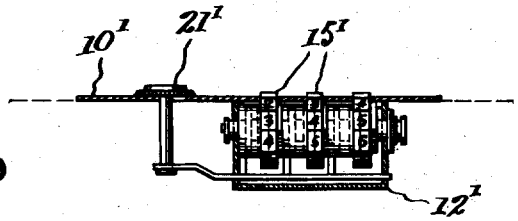
Fig. 9.
INVENTOR
A. G. Hatch
BY Wilkinson & Gusta
ATTORNEYS.

Reissued Dec. 27, 1927.

Re. 16,833

UNITED STATES PATENT OFFICE.

ALEXANDER GILCHRIST HATCH, OF FARMINGTON, CONNECTICUT, ASSIGNOR, BY MESNE ASSIGNMENTS, TO THE SESAMEE COMPANY, OF HARTFORD, CONNECTICUT, A CORPORATION OF CONNECTICUT.

KEYLESS LOCK.

Original No. 1,583,637, dated May 4, 1926, Serial No. 36,660, filed June 12, 1925. Application for reissue filed August 17, 1927. Serial No. 213,712.

This invention relates to improvements in keyless locks, and has for one of its objects to provide a device of this character which will be simple in construction, comparatively inexpensive to manufacture, and more efficient in use than those which have been heretofore proposed.

A further object of the invention is to provide a keyless or permutation lock embodying a simple and effective construction whereby the combination necessary to open the lock may be readily changed at will without the necessity of using a screw driver or any other instrument or tool, and independently of any movement of the bolt structure.

This combination-shifting feature is particularly applicable to keyless locks of the type represented generally by U. S. Patents Nos. 1,565,132, 1,583,635, 1,586,496, and 1,613,550.

Having the above-mentioned objects in view and others which will appear as the description proceeds the invention consists in the novel details of construction and combination and arrangement of parts more fully hereinafter described and particularly pointed out in the appended claims.

Referring to the accompanying drawings forming a part of this specification, in which like reference characters designate like parts in all the views:

Fig. 4 is a plan view similar to Fig. 1, but showing, also, the hasp member in operative locked position relative to the lock;

Fig. 5 is a vertical sectional view taken approximately on the plane indicated by the line 5—5 of Fig. 2, looking in the direction of the arrows;

Fig. 6 is a similar view taken approximately on the plane indicated by the line 6—6 of Fig. 2, looking in the direction of the arrows;

Fig. 7 is an expanded perspective view of the several parts, disassembled, which make up one of the permutation wheels or disks, together with the shield member therefor;

Fig. 8 is a diagrammatic plan view of a slightly modified form of the lock, suitable for application to a grip or hand-bag; and Fig. 9 is a longitudinal sectional view through the lock shown in Fig. 8, taken approximately on the plane indicated by the line 9—9, looking in the direction of the arrows.

Figure 1:
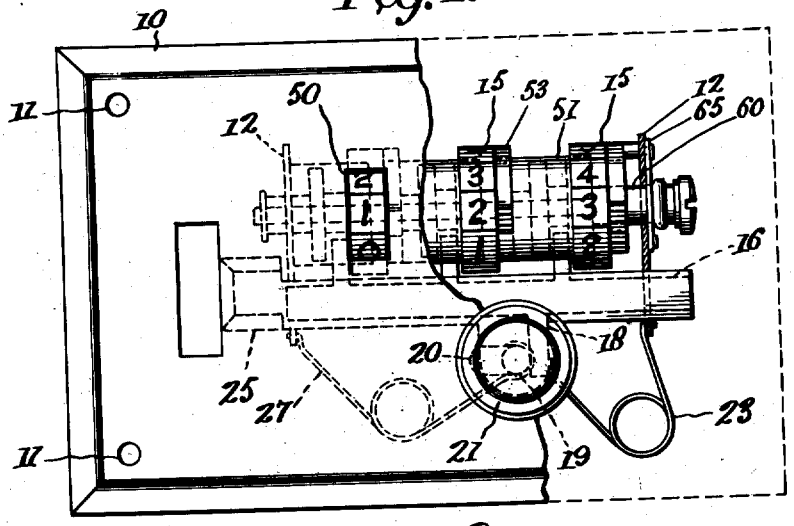
Fig. 1 is a top plan view of one form of permutation lock, constructed in accordance with the present invention, adapted for application to a suit-case; parts being represented as being broken away to show underlying structure.

Referring first to Figs. 1 to 7, inclusive, of the drawings, the numeral 10 indicates generally a face plate which serves as a support for the various locking parts of the lock and which may be secured to a wall of the suit-case or other device upon which the lock is to be mounted by means of suitable fastenings, not shown, which may pass through holes 11 provided in the said plate. Secured to the under surface of the face plate 10 in any suitable manner is a supporting frame, comprising a pair of members 12, which are apertured as at 13 to serve as journals for the shaft 14 which supports the permutation wheels. Of course, any number of such wheels may be employed, and for purposes of illustration, only, there have been shown three wheels 15, the detailed construction of which will be set forth more fully below. It might be mentioned in passing, however, that they are of the general type shown in the aforesaid U. S. Patent No. 1,583,635. As herein disclosed, the locking bolt, designated 16, is provided with a plurality of toes or projections 17 which are adapted to co-act with the wheels 15 to control the locking of the mechanism. The said bolt 16 is also provided with a projection 18 (see Figs. 1 and 2), which is adapted to bear against a pin 19 passing through an elongated slot 20 in the face plate 10 and provided on the outer side thereof with a suitable finger-piece or button 21. The pin 19, as will be readily understood from the drawings, is secured to a latch member 25, but is adapted to move the bolt 16 toward the right as viewed in Figs. 1 and 2, while the said bolt may be returned in the opposite direction by means of a spring 23 or other suitable motive means, one end of which engages the projection 18 and the other end of which may be seated in the right-hand frame member 12.

Figure 2:
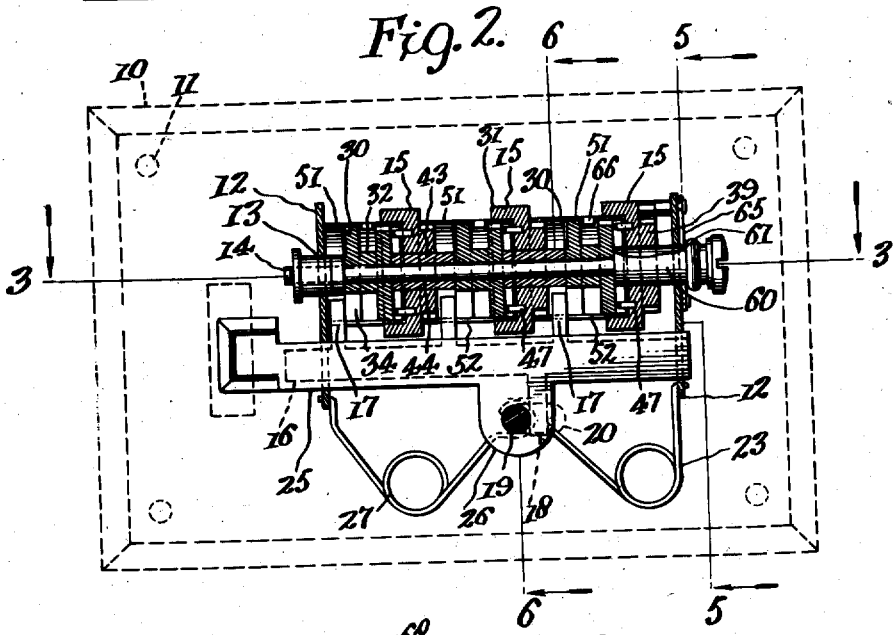
Fig. 2 is a longitudinal sectional view of the parts shown in Fig. 1; the section being taken on a plane parallel with the surface of the face plate.

Superposed upon the bolt member 16 is the slidable latch member 25, provided with a projection 26 through which the pin 19 passes. The latch member is adapted to be moved toward the right, as seen in Figs. 1 and 2, by the said pin, and to be returned to its initial position either by the same means or by the action of a spring 27, one end of which engages the said pin 19, while the other end thereof is seated in the left-hand frame member 12, as clearly shown in the said figures. The latch member 25 serves not only as a spring catch for the suit-case when the lock is open, but it also serves as a portion of the locking bolt to prevent the opening of the suit-case when the lock is closed, since, in the latter condition, movement of the pin 19 toward the right will be prevented by the bolt 16 which will be held fast by means to be hereinafter described.

Figure 3:
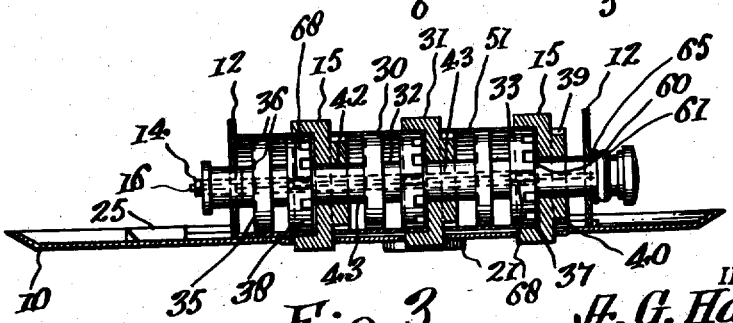
Fig. 3 is a longitudinal sectional view, taken approximately on the plane indicated by the line 3—3 of Fig. 2.

Each of the permutation wheels 15, as is best shown in Figs. 2, 3 and 7, comprises two principal parts, an inner member 30 and an outer member 31. The inner member 30 may comprise a cylinder provided intermediate its ends with a circumferential groove 32 in which the toes or projections 17 of the locking bolt 16 may ride when the parts are in the unlocked positions, as will appear more fully below. A flange at the left-hand end of the said member 30 is provided with a longitudinally-disposed slot 34 extending completely through the said flange and affording a passage for the said projection or toe 17 whereby the latter may move axially of the wheel from a position within the said groove 32 to a position to the left of the said flange.

The circular end face 35 of the member 30 is provided with a plurality of radially-extending grooves or recesses 36, which are all of substantially the same width as the slot 34 and which serve as false slots or recesses to prevent the unauthorized opening of the lock by a movement of the bolt toe into engagement with the said face 35, followed by a manipulation of the wheel, as a result of which the position of the slot 34 might be ascertained by the sense of touch in a manner similar to that explained in U. S. Patent No. 1,600,157.

The other member 31 of the wheel, as best shown in Fig. 7, comprises the indicia-bearing ring, one face of which may be recessed as indicated at 37 to receive a flange 38 of the member 30. The other face of the said member 31 may be provided with a somewhat reduced hub portion 39, the circumference of which may carry a plurality of detent notches 40 adapted to be engaged by a detent spring to be hereinafter described. The member 31 may also be provided with an axial bore 42 in which may be slidably mounted a bushing or sleeve 43. The said sleeve may have a bore 44 to receive the shaft 14, and the member 30 likewise may have a bore 45 whereby it may be slidably mounted upon the said shaft.

In order to operatively connect the two members 30 and 31 together, the former member may be provided, upon the end face opposite the one bearing the slots or grooves 36, with a plurality of radially-extending notches or recesses 46, while the member 31 may be provided within the recess 37 with a pair of longitudinally-extending projections or dowel pins 47, adapted to enter into the notches or recesses 46, so that when the member 31 is rotated movement will be communicated to the member 30 through the pin-and-slot connection.

As stated above, any desired number of permutation wheels may be employed, and in order to maintain the wheels in properly spaced relation and also in order to prevent the picking of the lock by means of a thin instrument inserted through the openings 50 of the face plate adjacent the wheels, in the manner described in my prior Patent No. 1,606,701, there may be provided the necessary number of substantially annular shield members 51, which are adapted to surround the members 30 when the parts are assembled, one end of each shield member fitting within one of the recesses 37 of a member 31, the other end surrounding the hub portion 39 of the adjacent wheel member. The said shield members 51 are prevented from rotating by means of the toes or projections 17 of the locking bolt 16 which project upwardly through elongated slots 52 extending longitudinally of the said members, as illustrated in Figs. 2 and 7. A portion of the end of the member 51 which surrounds the hub 39 may be suitably struck out and bent as indicated at 53, to constitute the detent spring to engage the detent notches 40 formed in the said hub portion 39 of that particular wheel member 31. These shield members are not a feature of the invention herein sought to be protected but are claimed in my aforesaid U. S. Patent No. 1,606,701.

One end of the shaft 14 may be enlarged as indicated at 60 (see Figs. 2 and 3), to substantially the same diameter as that of the sleeves 43, and it may enter and serve as a journal for the right-hand wheel member 31. The shoulder 61 formed by this enlarged portion may engage the right-hand face of the right-hand wheel member 30 as shown in Fig. 2, and the parts may be so designed and constructed as to permit a longitudinal movement of the said shaft relative to the frame members 12 for the purpose of releasing certain parts, thereby providing for a shifting of the combination, in a manner which will now be disclosed, whenever the owner of a device controlled by one of these locks has reason to believe that some unauthorized person has learned his combination, or, whenever, for any other reason, such a shift of the combination may be deemed desirable.

As described above, the members 30 and 31 are made separate and are connected for rotation as a unit by the pin-and-slot connections 46 and 47. So long as the parts occupy the positions shown in Fig. 2, for example, any rotation of the indicia-bearing member 31 will produce a corresponding rotation of the member 30 and the slot 34 of the member 30 will occupy a certain predetermined relation to the ring member 31 and the indicia carried thereby. If, however, it is decided to change this relation, as to one or more of the permutation wheels, it is only necessary to push inwardly upon the enlarged right-hand end of the shaft 14 to move the same axially of the lock, which motion will, through the enlarged portion 60, be communicated to the right-hand wheel member 30 and from it to the next succeeding wheel member 30 by means of the interposed sleeve 43. This longitudinal movement will, of couse, be communicated to all of the various members 30 which may be incorporated in the lock through the various sleeve members 43, as will be readily understood, and inasmuch as the combination members 31 associated with the various members 30 are held against longitudinal movement due to the fact that they project through the openings 50 in the face plate and are separated by the spacing shield members 51, such movements of the members will have the effect of disengaging the dowel pins or projections 47 of the members 31 from the radially-extending slots or grooves 46 of the members 30, whereupon it will be possible to freely rotate all of the indicia-bearing members 31 independently of the members 30 so as to change the relative positions between the slots 34 and their respective indicia. It may be observed that in order to accomplish this longitudinal movement of the parts the old combination will have to be set in order that, when the members 30 are moved toward the left, the slots 34 may accommodate the toes or projections 17 of the locking bolt and, of course, while the parts are in this position the members 30 will be prevented from rotating due to the fact that the projections 17 occupy these slots 34. A suitable spring 65 is provided on the right-hand frame member 12 for holding the shaft 14 in either of its longitudinal positions. Of course, after the new combination has been obtained the parts are returned to their initial positions by simply moving the shaft 14 to the right as viewed in the drawings.

The invention includes means to prevent the possibility of the combination being changed without first setting the permutation wheels, while the locking bolt 16 is in the unlocked position shown in Fig. 1. This might be accomplished in the manner above described by simply moving the shaft 14 toward the left, which would, in turn, cause the bolt 16 to be likewise moved to the left. To this end, the shield member 51 is provided with inwardly-extending projections 66 which normally enter into the circumferential grooves 32 of the members 30. These projections 66 extend inwardly far enough to engage against the right-hand wall of the groove 32, and should longitudinal movement toward the left of the members 30 be attempted such movement will be prevented by these projections, except when the said members 30 are in a certain position. In order to permit such movement under appropriate conditions, I provide a longitudinally-extending groove 68 leading from the circumferential groove 32 to the right-hand end of the member 30, which groove is preferably, although not necessarily, located at an angular interval of 180° from the slot 34 which accommodates the locking toe 17. The angular relation between these two grooves may be varied, this, of course, depending upon the particular positions of the inward projections 66 relative to the other parts.

As stated above, the slide member 25 not only serves to lock the suit-case but it may also serve as an ordinary spring latch when the suit-case is unlocked. That is to say, after the proper combination has been set and the knob or finger-piece 21 has been manipulated to move the pin 19 from the position shown in Fig. 2 to that shown in Fig. 1, thereby moving the bolt 16 from locked to unlocked position, if the combination is destroyed by moving one or more of the permutation wheels so that the bolt 16 is maintained in the position shown in Fig. 1, with its toes or projections 17 riding in the circumferential grooves 32 of the members 30, and if the finger-piece is then released the spring 27 will move the pin 19 and the latch member 25 to the position shown in Fig. 2 so that the extreme left end of the member 25 may engage the hasp and serve as a spring latch for the suit-case.

The principles described above in connection with the suit-case lock may be readily applied to other forms of locks, such, for example, as that shown in Figs. 8 and 9, which is particularly adapted for use on grips or hand-bags. Inasmuch as the changes necessary to adapt the invention to this form of lock embody only mechanical details and do not involve an inventive principle, it is not thought necessary to describe these figures in any greater detail than has already been done. The corresponding parts in these figures have been indicated by corresponding reference characters with primes added.

It is obvious that those skilled in the art may vary the details of construction as well as the arrangement of parts without departing from the spirit of the invention, and it is therefore not wished to be limited to the above disclosure except as may be required by the claims.

What is claimed is:

1. In a keyless lock, a plurality of permutation wheels, each comprising a pair of normally connected members; a locking bolt coacting with said wheels adapted to be locked thereby in open and closed positions; means for disengaging said pairs of members; and means for preventing the operation of said last-named means when said bolt is locked in open position.

2. In a keyless lock, a plurality of permutation wheels, each comprising a pair of normally connected members, one of which is provided with a circumferential groove, and a pair of axial slots leading from said groove to the opposite ends of said member; a bolt having a portion adapted to enter said groove through one of said slots; means for moving one member of each pair to disengage it from its companion member; and means adapted to ride in said groove and the other of said slots for preventing the operation of said last-named means when said bolt portion is in said groove and out of alignment with said first-named slot.

3. In a keyless lock for suit-cases and the like, a frame; a shaft mounted in said frame; a plurality of permutation wheels mounted on said shaft; a bolt coacting with said wheels, adapted to be locked in closed and open positions thereby; a slidable latch; manual means for moving both said bolt and said latch in one direction; and independent spring means for returning said bolt and said latch.

4. A keyless lock comprising a casing, and a lock mechanism mounted therein, said mechanism including a bolt, a plurality of permutation tumblers, each comprising a concealed lock-controlling element and a tumbler-setting element exposed for manipulation through an opening in said casing, couplings normally preventing relative movement between the composite elements of said tumblers, and a single coupling-disabling member accessible from the exterior of the assembled lock and movable independently of said bolt, whereby all of said couplings may be rendered ineffective, thereby permitting the combination of said lock to be readily changed by merely moving said tumbler-setting elements to any desired positions while said lock-controlling elements are held fast.

5. A keyless lock comprising a casing and a lock mechanism mounted therein, said mechanism including a bolt, a plurality of permutation tumblers, each comprising a concealed lock-controlling element and a tumbler-setting element exposed for manipulation through an opening in said casing, couplings normally preventing relative movement between the composite elements of said tumblers, stops to maintain said couplings in effective relation except when said tumblers have been set in a predetermined relation, and a single coupling-disabling member, accessible from the exterior of the assembled lock, and movable independently of said bolt, whereby all of said couplings may be rendered ineffective when the tumblers have been so set, at which time said stops comprise holding means to prevent movement of said lock-controlling elements, thereby permitting the combination of the lock to be readily changed by merely moving the tumbler-setting elements to any desired positions while said lock-controlling elements are held fast.

6. A keyless lock comprising a casing and a lock mechanism mounted therein, said mechanism including a bolt, a plurality of permutation wheels, each comprising a lock-controlling element and an indicia-bearing element exposed for manipulation through an opening in said casing, couplings normally preventing relative movement between the composite elements of said wheels, and a single coupling-disabling member, accessible from the exterior of the assembled lock, and movable independently of said bolt, whereby all of said couplings may be rendered ineffective, thereby permitting the combination of said lock to be readily changed by merely rotating said indicia-bearing elements to any desired positions while said lock-controlling elements are held fast.

7. A keyless lock comprising a casing, a catch so mounted therein as to be movable from an effective to an ineffective position, and vice versa, a locking bolt so mounted in said casing as to be movable from an effective position directly preventing movement of said catch to an ineffective position permitting independent movement thereof, and vice versa, and a locking mechanism for said bolt, said mechanism comprising a plurality of independently settable permutation tumblers each having a lock-controlling element movable into and out of the path of movement of a part of said bolt when in either of its two positions and preventing movement thereof from either position to the other except when said tumblers have been set in a predetermined relation.

8. A keyless lock comprising a casing, a catch so mounted therein as to be movable from an effective to an ineffective position, and vice versa, a locking bolt forming an extension of said catch, said bolt being so mounted in said casing as to be movable from an effective position preventing movement of said catch to an ineffective position permitting independent movement thereof, and vice versa, a locking mechanism for said bolt, said mechanism comprising a plurality of independently settable permutation tumblers each having a lock-controlling element movable into and out of the path of movement of a part of said bolt when in either of its two positions and preventing movement thereof from either position to the other except when said tumblers have been set in a predetermined relation, a manipulator whereby said catch may be retracted when free to move, a one-way driving connection between said catch and said bolt whereby the latter, if free, may be moved from its effective to its ineffective position by retracting said catch, and motive means capable of moving said bolt, when free, from its ineffective to its effective position and tending to maintain it there except when held fast in its ineffective position by said locking mechanism, the connection between said catch and bolt being such as to permit an independent return of the former to effective position independently of the latter but preventing a return of the latter in advance of a return of the former.

9. A keyless lock comprising a spring latch adapted to be snapped into engaging relation with a keeper, a manipulator by which said latch may be retracted when free, a locking bolt movable from an effective position preventing movement of said latch to an ineffective position permitting independent movement thereof, and vice versa, a locking mechanism for said bolt, said mechanism comprising a plurality of independently settable permutation tumblers each having a lock-controlling element movable into and out of the path of movement of a part of said bolt when in either of its two positions and preventing movement thereof from either position to the other except when set in a predetermined position, a one-way driving connection between said latch and said bolt whereby the latter, if free, may be moved from its effective to its ineffective position by retracting said latch, and motive means, independent of the spring of said latch, capable of moving said bolt, when free, from its ineffective to its effective position and tending to maintain it there except when held fast in its ineffective position by said locking mechanism, the connection between said latch and bolt being such as to permit an independent return of the former from its retracted to its effective position independently of the latter, but preventing a return of the latter from ineffective to effective position in advance of the return of the former.

In witness whereof, I have hereunto signed my name.

ALEXANDER GILCHRIST HATCH.